UNITED STATES PATENT OFFICE.

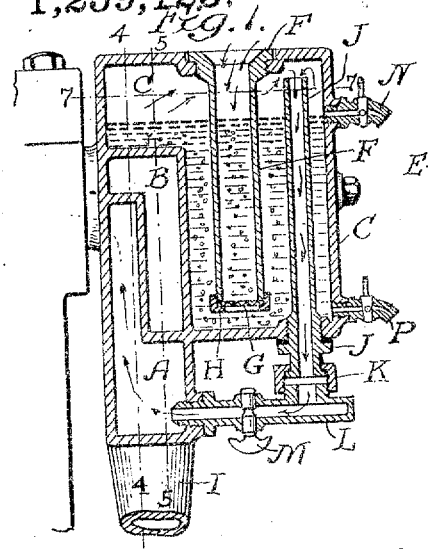
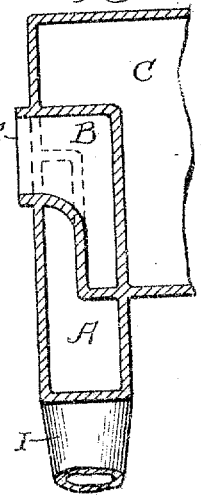
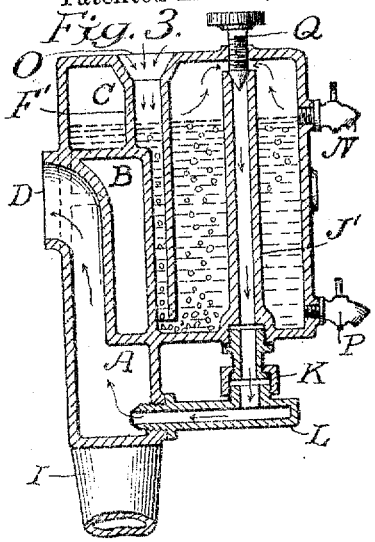
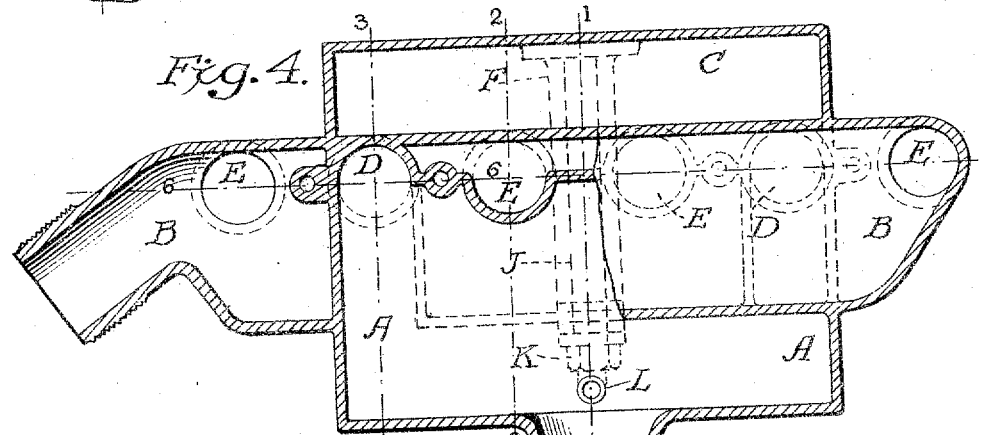
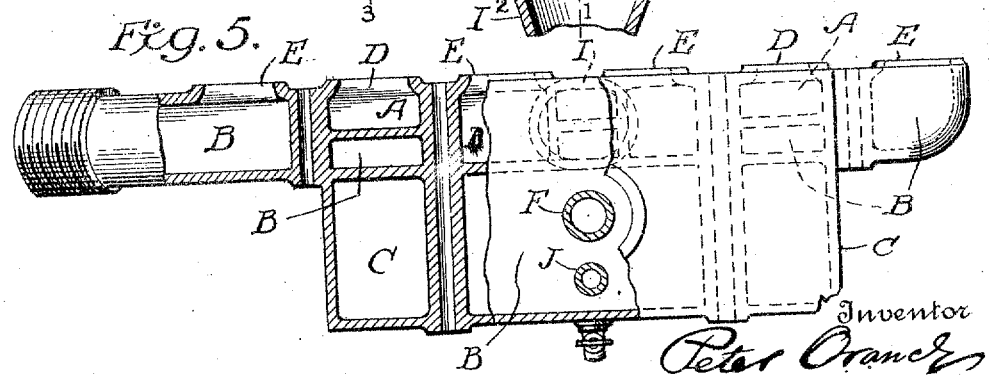

PETER ORANCE, OF NEW YORK, N. Y.

COMBINED MANIFOLD AND HUMIDIFIED-AIR-INJECTING DEVICE FOR INTERNAL-COMBUSTION ENGINES.

1,259,123.         Specification of Letters Patent.    Patented Mar. 12, 1918.

Application filed April 11, 1917. Serial No. 161,35.

*To all whom it may concern:*

Be it known that I, PETER ORANCE, a citizen of the Provisional Government of Russia, and a resident of New York city, in the county of New York and State of New York, have invented certain new and useful Improvements in Combined Manifold and Humidified-Air-Injecting Devices for Internal-Combustion Engines, of which the following is a specification.

The object of this invention is to combine into one piece of apparatus, the intake and exhaust manifolds of an internal-combustion engine and a humidified-air injecting device, the latter consisting substantially of a closed water reservoir into which dips a pipe communicating with the surrounding air, while another pipe connects the space above the water level in the reservoir with the fuel supply passage of the manifold.

A further object of this invention is to so arrange the combined manifold and moist-air injector that the exhaust gases not only heat the fuel supply passages, thereby preventing condensation in the manifold and completing the vaporization of the gas-mixture, but also heat the water-reservoir of the injector, thus causing the generation of water-vapor in the reservoir and warming the air drawn through the apparatus.

A compact apparatus combining both manifolds with the injecting device is applicable only to engines in which the intake and exhaust ports are situated together on the same side of the machine. When the intake ports are on one side and the exhaust ports on the other side of the engine, it is the object of the present invention to combine the injecting apparatus into one with the exhaust manifold and to connect it by a pipe with the intake manifold.

A number of patents have been granted on combination manifolds, in which the exhaust gases are made to heat the incoming fuel-gas supply by means of the heated dividing walls between the intake and exhaust passages. While some of these combinations have shown considerable fuel economy, they possess no provision for avoiding carbonization, and the present invention is designed to remedy this defect, thereby still further increasing the efficiency. For this purpose, the suction of the engine is caused to draw air through a body of heated water, thereby saturating it with moisture which, upon reaching the combustion chamber of the engine, is by the heat of the explosion converted into steam, thereby decarbonizing the working parts of the engine and preventing the formation of new deposits.

The construction of the improved apparatus will be understood from the following description, reference being had to the accompanying drawings in which—

Figure 1 is a lateral cross-section of the combined intake and exhaust manifold and moist-air injecting device, this section being taken on the line 1—1 of Fig. 4.

Fig. 2 is a lateral cross-section taken at the center of one of the exhaust ports, line 2—2 of Fig. 4.

Fig. 3 is a lateral cross-section taken at the center of one of the intake ports, line 3—3 of Fig. 4, showing a modified construction of the injecting apparatus.

Fig. 4 is a longitudinal cross-section of the combined manifold and moisture injector shown in Fig. 1, the left-hand portion of this section being along the line 4—4 of Fig. 1, and the right-hand portion along the line 5—5 of Fig. 1.

Fig. 5 is a top-view, partly in cross-section, of the combined manifold and moisture injector, the section at the left being taken along the line 6—6 of Fig. 4, and the section to the right along the line 7—7 of Fig. 1.

Referring to Figs. 1 to 5, A is the fuel-intake passage and B the exhaust passage of an internal-combustion engine. These two passages are combined into a common manifold casting with which is also incorporated the water-reservoir C. The arrangement of the dividing walls of the manifold casting is shown in Figs. 4 and 5, from which it is seen that the exhaust gases are made to follow a wave-like path around the port-chambers designed to fit upon the intake ports of the engine which, in the case illustrated, is supposed to have two intake ports and four exhaust ports, the intake openings D fitting upon the former and the exhaust openings E upon the latter. A cross-section through one of the exhaust port-openings E, taken at 2—2 in Fig. 4, is shown in Fig. 2, and a cross-section through one of the intake port-openings D, taken at 3—3 in Fig. 4, is shown in Fig. 3. From Figs. 1, 2 and 3, it is also seen that the outside wall of the exhaust passage forms part of the wall of the water-reservoir, thereby heating the water and vaporizing a portion of it.

Into the top of the water-reservoir C is inserted a vertical pipe F open to the atmosphere on top and made of such length as to reach almost to the bottom of the reservoir, the lower end of this pipe F being provided with a fine-meshed screen G attached to the pipe by means of a screw-collar H or some similar device. Into the bottom of the reservoir C, in line with the fuel inlet arm I of the manifold, is inserted a second vertical pipe J, the latter being made of such length as to reach almost to the closed top of the reservoir. The lower end of pipe J is fitted with a pipe-union K by means of which pipe J is joined to a T-connection of a horizontal pipe L, which in turn is inserted into the fuel-supply passage of the manifold near its junction with the inlet arm I. Between its junction with the pipe J and its attachment to the manifold, a stop-cock M or other flow-controlling device is inserted into pipe J, so that the passage into the manifold can be partly or entirely closed up, if desired. To prevent the water-reservoir from being filled up too high, a stop-cock N is placed at the proper level, this stop-cock to be opened when replenishing the water so as to indicate when too much water has entered the reservoir, and to be closed after all surplus water has escaped. Another stop-cock P is placed at the bottom of the water tank to enable the cleaning-out of the latter.

The operation of the device is as follows: Upon starting the engine, fuel-gas is sucked into the cylinders through the intake ports D, the exhaust gases being expelled through the ports E into the passages B, thereby heating the walls of the manifold. When the stop-cock M is open, the suction of the engine, acting through pipes L and J, creates a vacuum above the water-level in the reservoir C, thus causing air to be forced into the pipe F, expelling the water contained in the lower part of this pipe. After having passed through the fine-meshed screen G at the end of pipe F, whereby it is thoroughly broken up, the air rises through the water on the outside of pipe F and reaches the vacuum above the water level whence it is sucked, together with the vapor produced by heating the water, into pipe J and finally passes through pipe L into the manifold. By its passage through the heated water, the air is thoroughly saturated with water-vapor and moisture, which upon reaching the combustion chambers is transformed into steam, the action of the latter being to loosen any carbon-deposits which may have formed on the combustion chamber and cylinder walls, piston heads, or spark-plugs, and thus to de-carbonize the working parts of the engine.

In Fig. 3, a modification of the air-humidifying device is illustrated. Here the pipes F and J of Fig. 1 are replaced by chambers F' and J' respectively, cast in one with the reservoir, an opening O being provided in the cover of the reservoir through which air can enter into chamber F'; otherwise, the construction and operation of the device is identical with the former arrangement, except that the stop-cock M in pipe L is replaced by a valve Q inserted from the top of the reservoir and controlling the opening of chamber J'. Instead of casting the chambers F' and J' in the form of pipes as shown, they may be made of rectangular or any other convenient cross-section. Furthermore, the relative position of the pipes F and J, or chambers F' and J', may be varied from that shown in Figs. 1 and 3; thus, instead of placing one in front of the other, they may be arranged side by side, and instead of placing pipe F, or chamber F', in the middle of the tank, it may be placed at one end, thereby increasing the length of the air-path.

Having thus described my invention, I make the following claims:

1. The combination, with the exhaust manifold of an internal-combustion engine, of a fuel supply manifold having ports located between the different ports of the exhaust manifold, the fuel intake and exhaust passages of said manifold being interlinked with one another; and of a closed water reservoir having one of its walls in common with the exhaust passage of said manifold; the said water reservoir containing one chamber communicating with the atmosphere and extending to within a small distance from the bottom of the reservoir, and another chamber connecting the space above the water level in the said reservoir with the fuel supply passage of the manifold, the latter chamber having a controllable injector-connection with the fuel supply manifold.

2. The combination, with the exhaust manifold of an internal-combustion engine, of a fuel-supply manifold having ports located between the different ports of the exhaust manifold, the fuel intake and exhaust passages of said manifolds being interlinked with one another; and of a closed water reservoir having one of its walls in common with the exhaust-passage of said manifold; the said water reservoir having a vertical pipe inserted from above and extending to within a small distance from the bottom of the reservoir, its upper end being open to the atmosphere, and its lower end being covered by a fine-meshed screen, and a second vertical pipe inserted from below and extending to within a small distance from the top of the reservoir, its upper end being well above the water-level and its lower end being connected to a horizontal pipe communicating with the fuel supply passage of the manifold, a flow-controlling device being inserted in the said horizontal connecting pipe.

3. The combination, with the exhaust manifold of an internal-combustion engine, of a water reservoir having one of its walls in common with the exhaust passage of said manifold; the said water reservoir having a chamber communicating with the atmosphere and extending to within a small distance from the bottom of the reservoir, and a pipe connecting the space above the water level in the said reservoir with the fuel intake manifold of the engine, the said connecting pipe having a controllable injector connection with the said fuel intake manifold.

Signed at New York city in the county of New York and State of New York.

PETER ORANCE.

Witnesses:
ALFRED E. WIENER,
FRANK B. COOPER.